United States Patent Office 3,219,434
Patented Nov. 23, 1965

3,219,434
PROCESS FOR THE PRODUCTION OF
CHROME CONCENTRATES
Alfred R. Globus, Forest Hills, N.Y., assignor to United
International Research, Inc., Long Island City, N.Y.,
a corporation of New York
No Drawing. Filed May 2, 1962, Ser. No. 191,747
8 Claims. (Cl. 75—1)

This invention relates to a process for the production of chrome concentrates. The invention more particularly relates to the production of chrome concentrates with improved chrome values and/or improved chrome to iron ratios from ores which are initially poor in these respects. Many chrome-ore deposits contain either too low a content of $Cr_2O_3$, or so high a proportion of iron to chrome as to render the same unsatisfactory for producing chrome alloys, as for example, ores which contain $Cr_2O_3$ have a very low ratio of Cr:Fe, as for example of 2.5:1, or even as low as 2:1. Many domestic ores in addition to having this high proportion of iron will only contain about 20/30% of $Cr_2O_3$ after initial separation, which makes their treatment for the recovery of chrome values uneconomical.

One object of this invention is a novel process for upgrading chrome values in these low grade ores and favorably increasing the ratio of chrome to iron. A further object of this invention is a process for producing chrome concentrates having a ratio of chrome to iron of at least 4:1, or even as high as 5:1.

These and still further objects will become apparent from the following description.

The starting material for the process of the invention consists of any conventional chrome-ore in finely ground form as, for example, having a particle size of —200 mesh U.S. Standard screen size. While the process is particularly applicable for upgrading ores which are low in $Cr_2O_3$, or which have a relatively high proportion of iron with respect to the chrome, the process may be used in connection with richer ores in order to still further increase the $Cr_2O_3$ content or the ratio of chrome to iron, as for example to above 4:1.

The ground chrome-ore is mixed with lime or calcium carbonate and sodium carbonate preferably in the crude form of soda ash. Amounts of lime and/or calcium carbonate of 20 to 55% based on the $Cr_2O_3$ content in the ore, and amounts of sodium carbonate of 25 to 40% and preferably 30 to 35% based on the chrome content in the ore, are suitably used. The lime or calcium carbonate and the sodium carbonate are preferably in the form of 200 mesh powder, and most preferably the lime or calcium carbonate is in the form of dust to avoid fusion.

The mixture of the ore and the lime or calcium carbonate and sodium carbonate is subjected to oxidation with air, as for example in a rotary kiln at a temperature between 1000 and 1400° F. The oxidation is thus basically the conventional treatment except that it is preferable to use somewhat lower temperatures and longer reaction periods. The oxidation treatment results in the conversion of $FeO \cdot Cr_2O_3$ to $Na_2CrO_4 + CaCrO_4$ with the liberation of carbon dioxide gas which may be further utilized in the process as hereinafter described. The chromium oxide in the ore has thus been converted to soluble chromates which is then leached thoroughly and the liquid phase separated from the solid phase as, for example, by filtration with the solid residue being discarded. The liquid phase is then evaporated either to the formation of crystals or to complete dryness. Preferably the evaporation is effected with a multistage evaporation. The product obtained from the evaporation consists predominantly of sodium chromate and calcium chromate, the amount of calcium chromate being determined by the amount of calcium carbonate used. The soluble chromates which have thus been obtained are then mixed with the untreated chrome-ore in amounts calculated to increase the chrome content to the desired value and/or to increase the chrome to iron ratio to the desired value as for example, above 4:1. Thus, for instance, if the initial ore has a ratio of chrome oxide to iron oxide of 2:1, enough chromate can be added to produce a ratio of 4:1 or more if desired.

The ore-chromate mixture is then contacted with carbon monoxide under conditions of elevated temperature sufficient to convert the chromates to $Cr_2O_3$. For this purpose the ore-chromate mixture is preferably heated in a kiln or other furnace to dull red heat where the same is agitated and the carbon monoxide is passed over the hot mixture. The chromate is thus reduced to $Cr_2O_3$ and the carbon monoxide is converted to carbon dioxide which reacts with the sodium and calcium oxide of the chromate forming a mixture of predominantly sodium carbonate and some calcium carbonate. The excess of carbon dioxide formed ensures the most complete conversion of the sodium oxide to form $Na_2CO_3$, but not the poorly soluble $NaHCO_3$, since the temperature of the reaction is high enough to decompose the bicarbonate of soda.

The treatment with the carbon monoxide is preferably effected at dull red heat, and preferably at a temperature of 300 to 500° F. with an excess of CO. As carbon dioxide is not troublesome in the process, any available commercial source of carbon monoxide may be used. In accordance with a preferred embodiment of the invention the carbon monoxide is obtained by passing the gas coming from the oxidation in the first state which is rich in carbon dioxide through a bed of hot coke which reduces the same to carbon monoxide.

The product obtained by the carbon monoxide treatment is leached with water to remove the sodium carbonate and the residue is dried forming a chrome concentrate which is suitable for sale, or which may be briquetted by the addition of a small amount of binder prior to drying. The wash solution used in the leaching is evaporated using a conventional evaporator and the soda ash thus recovered is recycled to the first stage for admixture with the chrome ore being passed to the oxidation.

If products obtained from the carbon monoxide heating are not thoroughly washed, enough residual sodium oxide will remain to bind the concentrates together once they have been briquetted. This is probably due to the formation of sodium silicate or residual sodium chromate which acts as a binder.

The calcium carbonate produced in the concentrates by the reduction of the calicum chromate and the subsequent reaction of the released calcium oxide with the carbon dioxide is advantageous since it remains with the concentrate and will serve to flux the silica and siliceous material present. Since this calcium carbonate is not soluble, a build-up thereof in the soda ash recycled does not take place.

The invention thus allows the ennobling of the chrome values of low grade chrome ores in any desired manner and allows an adjustment of the chrome-iron ratio to obtain at will ratios of 4:1, 4.5:1 or 5:1 to suit the market demand and sell for premium prices.

The following example is given by way of illustration and not limitation.

*Example*

1000 pounds of chrome ore having the following analysis: 26% $Cr_2O_3$, 12% $Fe_2O_3$, and a particle size between 200 to 300 mesh were admixed with 250 pounds of lime and 400 pounds of soda ash of —300 mesh. The mixture was oxidized in a rotary kiln heated by natural gas at 1100 to 1200° C. for 2 to 3 hours, and the product was leached with 200 gallons of water at normal temperature and subjected to filtration. The filtrate was evaporated in multi-stage evaporators and 800 pounds of the original chrome ore were admixed with the evaporation residue. The tail gas from the oxidation treatment was passed through a bed of hot coke to form monoxide. The mixture of the evaporation residue and chrome-ore was heated to a dull red heat (300° F.) in a kiln, and the carbon monoxide from the hot coke bed was passed over the same for 2 hours with a throughput of 200 pounds of CO for this entire charge. After treatment with the carbon monoxide the solid mixture was washed with 200 gallons of water at room temperature in a mechanical agitator. The washing water was evaporated in a multiple effect evaporator and the residue which consisted of soda ash recovered for further oxidation treatment of the chrome-ore. The residue after the washing treatment was admixed with 25 pounds of sodium silicate, and briquetted in a conventional briquetting machine and dried. The analysis of the final 1068 pounds of chrome concentrate was as follows:

44% $Cr_2O_3$
9.8% $Fe_2O_3$

While the invention has been described in detail with reference to certain specific embodiments, various changes and modifications which fall within the spirit of the invention and scope of the appended claims will become apparent to the skilled artisan.

The invention is only intended to be limited by the appended claims or their equivalents wherein I have endeavored to claim inherent novelty:

I claim:

1. Process for the production of chrome concentrates which comprises mixing chrome-ore with a member selected from the group consisting of sodium chromate, calcium chromate and mixtures thereof, contacting the mixture with carbon monoxide under conditions of elevated temperature sufficient to convert said group member to $Cr_2O_3$, washing the reaction mixture with water and recovering a chrome concentrate by drying.

2. Process according to claim 1 in which said group member predominantly consists of sodium chromate.

3. Process according to claim 1 in which said chrome-ore has a Cr:Fe ratio below 4:1 and in which mixing is effected with an amount of said group member sufficient to increase said Cr:Fe ratio to above 4.

4. Process according to claim 1 in which said group member is formed by oxidation of chrome-ore in the presence of lime and soda ash.

5. Process for the production of chrome concentrates which comprises oxidizing chrome-ore in the presence of sodium carbonate and a member selected from the group consisting of calcium carbonate and calcium oxide, leaching the product obtained from the oxidation treatment, evaporating the leaching liquid to obtain a solid product, admixing said solid product with chrome-ore, contacting the mixture with carbon monoxide under conditions of elevated temperatures sufficient to convert soluble chromates in the product to $Cr_2O_3$, washing the reaction mixture with water and recovering a chrome concentrate by drying.

6. Process according to claim 5 in which the tail gas from said oxidation is passed through a bed of hot coke and recycled for said contacting with carbon monoxide.

7. Process according to claim 5 in which the liquid from said last mentioned washing is evaporated to form soda ash for admixture with the chrome ore for said oxidation.

8. Process according to claim 5 in which said chrome-ore has a Cr:Fe ratio below 4 and in which said mixing is effected with a proportion of chrome-ore to increase the chrome iron ratio thereof to above 4.

References Cited by the Examiner

UNITED STATES PATENTS

| | | | |
|---|---|---|---|
| 1,975,338 | 10/1934 | Vetter | 23—56 X |
| 2,098,176 | 11/1937 | Udy | 23—56 X |
| 2,430,261 | 11/1947 | Udy | 75—121 X |
| 2,587,552 | 2/1952 | Vedensky | 23—56 |
| 3,105,756 | 10/1963 | Green | 75—1 |

BENJAMIN HENKIN, *Primary Examiner.*

DAVID L. RECK, *Examiner.*